Patented Apr. 14, 1942

2,279,985

UNITED STATES PATENT OFFICE 2,279,985

PROCESS FOR THE MANUFACTURE OF CHLORIDES OF CARBOXYLIC ACIDS

Charles Graenacher, Riehen, and Carlo Rossi, Basel, Switzerland, assignors to the firm of Society of Chemical Industry in Basle, Basel, Switzerland No Drawing. Application March 29, 1940, Serial No. 326,802. In Switzerland April 15, 1939

8 Claims. (Cl. 260—408)

It has been found that chlorides of high molecular carboxylic acids are obtained when phosgene is allowed to act at a temperature above 100° C. on high molecular carboxylic acids, particularly on those which contain at least 8 carbon atoms, in the presence of small quantities of tertiary amines or of their salts.

As high molecular carboxylic acids in the present process, use may be made, for example, of high molecular aliphatic, cycloaliphatic, aromatic, and mixed aliphatic-aromatic carboxylic acids, such as lauric, myristic, palmitic, stearic, arachidic, oleic or chlorostearic acids, also of resin and naphthenic acids, further, of naphthoic acid or of those aromatic carboxylic acids which have a high molecular aliphatic radical in the nucleus or in a substituent.

As tertiary amines, use may be made in the present case of, for example, pyridine bases, quinoline, trimethylamine, triethylamine, dimethylcyclohexylamine or dimethylaniline. As salts of the tertiary amines there may, for example, be used the salts of hydrohalic acids, such as the hydrochlorides.

The conversion of the high molecular carboxylic acid into the carboxylic acid chloride takes place when phosgene is allowed to act on the carboxylic acid which is heated to a temperature above 100° C., for example, to 120–180° C., but preferably to about 140–160° C. Difficultly volatile tertiary amines may be added before the commencement of the phosgene treatment, whereas more readily volatile tertiary amines are preferably added to the reaction mixture shortly after the action of the phosgene has commenced. By the addition of the tertiary amine, which is immediately converted into the hydrochloride, the speed of reaction as well as the yield in acid chloride increases. According to the present process—which may also be worked in a continuous manner—high molecular carboxylic acids may be converted into carboxylic acid chlorides in the most simple manner and with practically quantitative yield.

Example 1

300 parts by weight of technical stearic acid are melted and heated to 150° C. Whilst stirring, phosgene is led into the liquid acid, which is maintained at a temperature of 145–150° C., the stream of gas being so regulated that the quantity introduced amounts to about 45–55 parts by weight per hour. After the first 5 minutes, 15 parts by weight of pyridine are added to the reaction mixture, which at once is converted into the solid addition-compound.

The course of the reaction is followed by titration of a sample removed by a pipette to ascertain its content of reactive chlorine. After 3½ hours the reaction is complete, and the stearic acid is converted into stearoyl chloride to an extent of 99.6%. The liquid stearic acid chloride is separated from the pyridine hydrochloride by decantation. The pyridine hydrochloride may be used for a subsequent operation.

In a similar manner, other high molecular carboxylic acids, such as caprylic acid, oleic acid, naphthoic acid, or naphthenic acids, may be converted into their carboxylic acid chlorides. In place of pyridine, trimethylamine, dimethylcyclohexylamine or alkylated pyridines may be used.

Example 2

300 parts by weight of hardened whale oil fatty acids (average molecular weight=306) are treated with phosgene exactly in the manner described in Example 1. After 3⅓ hours, the fatty acid has been converted quantitatively into the corresponding acid chloride.

What we claim is:

1. A process for the manufacture of chlorides of carboxylic acids, comprising treating carboxylic acids containing at least 8 carbon atoms with phosgene at temperatures higher than 100° C. in the presence of a small amount of a salt of a tertiary amine.

2. A process for the manufacture of chlorides of carboxylic acids, comprising treating aliphatic carboxylic acids containing at least 8 carbon atoms with phosgene at temperatures higher than 100° C., in the presence of a small amount of a salt of a tertiary amine.

3. A process for the manufacture of chlorides of carboxylic acids, comprising treating aliphatic carboxylic acids containing an even number of carbon atoms between 10–20 with phosgene at temperatures higher than 100° C. in the presence of a small amount of a salt of a tertiary amine.

4. A process for the manufacture of chlorides of carboxylic acids, comprising treating aliphatic carboxylic acids containing an even number of carbon atoms between 10–20 with phosgene at temperatures higher than 100° C. in the presence of a small amount of a salt of a tertiary amine of the pyridine series.

5. A process for the manufacture of stearic acid chloride, comprising treating stearic acid with phosgene at temperatures higher than 100° C. in the presence of a small amount of a salt of a tertiary amine of the pyridine series.

6. A process for the manufacture of stearic acid chloride, comprising treating stearic acid with phosgene at temperatures between 120–180° C. in the presence of a small amount of a salt of pyridine.

7. A process for the manufacture of the chloride of hardened fish oil fatty acid, comprising treating hardened fish oil fatty acid with phosgene at temperatures higher than 100° C. in the presence of a small amount of a salt of a tertiary amine of the pyridine series.

8. A process for the manufacture of the chloride of hardened fish oil fatty acid, comprising treating hardened fish oil fatty acid with phosgene at temperatures between 120–180° C. in the presence of a small amount of a salt of pyridine.

CHARLES GRAENACHER.
CARLO ROSSI.